(12) United States Patent
Topiwala et al.

(10) Patent No.: US 10,306,238 B2
(45) Date of Patent: *May 28, 2019

(54) ADAPTIVE CODING, TRANSMISSION AND EFFICIENT DISPLAY OF MULTIMEDIA (ACTED)

(71) Applicant: FastVDO LLC, Melbourne, FL (US)

(72) Inventors: Pankaj Topiwala, Cocoa Beach, FL (US); Wei Dai, Clarksville, MD (US); Madhu Peringassery Krishnan, Columbia, MD (US)

(73) Assignee: FASTVDO LLC, Cocoa Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/447,739

(22) Filed: Mar. 2, 2017

(65) Prior Publication Data
US 2017/0180740 A1    Jun. 22, 2017

Related U.S. Application Data

(63) Continuation of application No. 14/226,680, filed on Mar. 26, 2014, now Pat. No. 9,609,336.
(Continued)

(51) Int. Cl.
*H04N 19/115*    (2014.01)
*H04N 19/164*    (2014.01)
(Continued)

(52) U.S. Cl.
CPC ......... *H04N 19/164* (2014.11); *H04N 19/115* (2014.11); *H04N 19/124* (2014.11);
(Continued)

(58) Field of Classification Search
CPC .. H04N 19/115; H04N 19/124; H04N 19/156; H04N 19/164; H04N 19/172
(Continued)

(56) References Cited

U.S. PATENT DOCUMENTS 6,816,194 B2 * 11/2004 Zhang .................. H04N 19/89
375/240.12
7,664,185 B2 * 2/2010 Zhang .................. H04N 19/89
375/240.26
(Continued)

OTHER PUBLICATIONS

Wu et al, A study of encoding and decoding techniques for syndrome-based video coding, 2005.*
(Continued)

*Primary Examiner* — Shan E Elahi
(74) *Attorney, Agent, or Firm* — Fenwick & West LLP

(57) ABSTRACT

Embodiments of the invention receive videos and feedback data associated with the videos from a client device and adaptively encode the videos based on the feedback data. The encoded videos are suitable to be transmitted over a network and displayed on the client device. Embodiments of an encoding server adaptively changes resolution of a video on the fly or scale the video quality up or down based on the factors described by the feedback data, including network condition for transmitting the encoded video, network delay, encoder and decoder processing capacity and feedback from viewers of the decoded video. Furthermore, the encoding server adaptively encodes the video based on a combination of various factors described by the feedback data.

20 Claims, 10 Drawing Sheets

Related U.S. Application Data

(60) Provisional application No. 61/812,555, filed on Apr. 16, 2013.

(51) Int. Cl.
*H04N 19/172* (2014.01)
*H04N 19/124* (2014.01)
*H04N 19/156* (2014.01)
*H04N 19/166* (2014.01)

(52) U.S. Cl.
CPC ......... *H04N 19/156* (2014.11); *H04N 19/172* (2014.11); *H04N 19/166* (2014.11)

(58) Field of Classification Search
USPC .................................................... 375/240.07
See application file for complete search history.

(56) References Cited

U.S. PATENT DOCUMENTS

| | | | | |
|---|---|---|---|---|
| 7,684,493 B2* | 3/2010 | Zhang | H04N 19/89 | 375/240.26 |
| 7,684,494 B2* | 3/2010 | Zhang | H04N 19/89 | 375/240.26 |
| 7,684,495 B2* | 3/2010 | Zhang | H04N 19/89 | 375/240.26 |
| 7,826,537 B2* | 11/2010 | Zhang | H04N 19/89 | 375/240.27 |
| 8,340,177 B2* | 12/2012 | Ji | H04N 19/63 | 375/240.11 |
| 8,374,238 B2* | 2/2013 | Xiong | H04N 19/172 | 375/240.11 |
| 8,442,108 B2* | 5/2013 | Song | H04N 19/63 | 348/426.1 |
| 9,609,336 B2* | 3/2017 | Topiwala | H04N 19/164 | |
| 2002/0021761 A1* | 2/2002 | Zhang | H04N 19/89 | 375/240.27 |
| 2005/0041745 A1* | 2/2005 | Zhang | H04N 19/89 | 375/240.27 |
| 2005/0063463 A1* | 3/2005 | Zhang | H04N 19/89 | 375/240.08 |
| 2005/0069036 A1* | 3/2005 | Zhang | H04N 19/89 | 375/240.08 |
| 2005/0089105 A1* | 4/2005 | Zhang | H04N 19/89 | 375/240.27 |
| 2005/0135477 A1* | 6/2005 | Zhang | H04N 19/89 | 375/240.08 |
| 2005/0249196 A1* | 11/2005 | Ansari | H04L 12/2803 | 370/352 |
| 2006/0088094 A1* | 4/2006 | Cieplinski | H04N 21/23406 | 375/240.01 |
| 2006/0179201 A1* | 8/2006 | Riedel | G09G 5/006 | 710/305 |
| 2008/0107180 A1* | 5/2008 | Lee | H04N 19/52 | 375/240.16 |
| 2010/0074333 A1* | 3/2010 | Au | H04N 19/51 | 375/240.12 |
| 2010/0098155 A1* | 4/2010 | Demircin | H03M 7/4006 | 375/240.02 |
| 2011/0004912 A1* | 1/2011 | Teniou | H04N 21/234318 | 725/118 |
| 2011/0164677 A1* | 7/2011 | Lu | H04N 19/176 | 375/240.02 |
| 2011/0255589 A1* | 10/2011 | Saunders | H04N 19/176 | 375/240.01 |
| 2011/0255594 A1* | 10/2011 | Nagori | H04N 19/196 | 375/240.03 |
| 2011/0261885 A1* | 10/2011 | de Rivaz | H04N 19/42 | 375/240.16 |
| 2011/0293001 A1* | 12/2011 | Lim | G06K 9/36 | 375/240.12 |
| 2012/0047535 A1* | 2/2012 | Bennett | G09G 3/003 | 725/62 |
| 2012/0056981 A1* | 3/2012 | Tian | H04N 19/597 | 348/42 |
| 2012/0106622 A1* | 5/2012 | Huang | H04N 19/129 | 375/240.01 |
| 2012/0200669 A1* | 8/2012 | Lai | G06T 5/002 | 348/43 |
| 2012/0300843 A1* | 11/2012 | Horlander | H04N 19/597 | 375/240.12 |
| 2013/0051271 A1* | 2/2013 | Cao | H04L 41/5067 | 370/252 |
| 2013/0259118 A1* | 10/2013 | Fu | H04N 19/00066 | 375/240.02 |
| 2014/0036999 A1* | 2/2014 | Ryu | H04N 19/50 | 375/240.12 |

OTHER PUBLICATIONS

Aruna, N et al, Compressed sensing based quantization with prediction encoding for video transmission in WSN, 2015.*

Bhattacharyya et al, Arbitrary spatial downsizing in H.264 to MPEG-4 simple profile transcoder, 2009.*

* cited by examiner

| Color Transform | a | b | c | d | R | G | B |
|---|---|---|---|---|---|---|---|
| YCgCo | -1 | ½ | -1 | ½ | 1/4 | ½ | 1/4 |
| YFbFr | -1 | ½ | -1 | 3/8 | 5/16 | 3/8 | 5/16 |
| YFbFr2 | -1 | ½ | -1 | 5/8 | 5/16 | 5/8 | 5/16 |
| YFbFr3 | -1 | ½ | -1 | 23/32 | 9/64 | 23/32 | 9/64 |
| YFbFr4 | -1 | ¾ | -1 | 23/32 | 27/128 | 23/32 | 9/128 |

- b=d=1/2. Get YCgCo.
- b=1/2, d=3/8. Get YFbFr.
- b=1/2, d=5/8. Get YFbFr2.
- b=1/2, d=23/32. Get YFbFr3.
- b=3/4, d=23/32. Get YFbFr4.

Y=[1/4, ½, 1/4] in RGB.
Y=[5/16,3/8, 5/16] in RGB.
Y=[3/16,5/8, 3/16] in RGB.
Y=[9/64, 23/32, 9/64] in RGB.
Y=[27/128, 23/32, 9/128] in RGB.

ADAPTIVE CODING, TRANSMISSION AND EFFICIENT DISPLAY OF MULTIMEDIA (ACTED)

CROSS-REFERENCE TO RELATED APPLICATIONS

This application is a continuation of co-pending U.S. patent application Ser. No. 14/226,680 filed Mar. 26, 2014, which claims the benefit of U.S. Provisional Application No. 61/812,555, filed Apr. 16, 2013, all of which are incorporated by reference in their entirety.

BACKGROUND

This invention relates generally to multimedia signal processing, and more specifically to adaptive coding, transmission and efficient display of digital content of multimedia.

Many international standards have been established for the communication of multimedia data, especially video and audio data, over a variety of communications networks. These coding and transmission standards and many existing solutions for coding and transmitting of multimedia arose largely in the context of a broadcast (or fixed media such as DVD) model of multimedia distribution. In a broadcast model of multimedia distribution, pre-compressed multimedia is broadcast (or stored in digital storage devices) to all users simultaneously, and all receivers (e.g., multimedia decoding devices) decode the same multimedia signal to the best of their abilities.

To allow multiple vendors to interoperate in multimedia coding and distribution, it was necessary to standardize only the syntax of an encoded bitstream of multimedia, e.g., by standardizing multimedia decoders, and leave the actual encoding to content providers. Thus, for the most part, the existing multimedia coding standards do not answer the question of how to optimize an entire communications channel, right up to human viewing of the processed multimedia; instead, most elements of the communication channel are addressed individually.

More and more digital multimedia content, e.g., digital video and audio, is now being delivered over Internet Protocol (IP) networks such as the Internet. The model of the effective communications channel (e.g., for home entertainment) is evolving rapidly in the marketplace, favoring direct and individualized streams for each receiver (e.g., web-based, streaming services) over the previous broadcast model. Even when the data is pre-compressed, there is now the ability to store various versions of the same content at different bit rates, allowing real-time stream switching to adjust to channel conditions (an approach generally referred to as "simulcast"). While TV still has a schedule, more and more digital content is now available in pre-stored format, created real-time or on-demand. The rapid development of processing and distribution of digital content of multimedia calls for more efficient solutions.

Moreover, there has been a massive proliferation of digital consumer devices on which the digital content of multimedia is consumed, from giant TV monitors all the way down to handsets. The needs and capabilities of the emerging consumer devices, coupled with the associated evolving user viewing conditions, all vary tremendously. In this situation, the previous one-size-fits-all approach for digital content processing and distribution is ineffective. Thus, the challenges of existing solutions to efficient multimedia processing and distribution problems and applications call for an efficient and robust system-level solution that meets the challenges.

SUMMARY

Embodiments of the invention enhance and facilitate multimedia (e.g., videos) transmissions over various communications channels, and particularly for human entertainment consumption. The solutions provided by the embodiments of the invention enable simultaneously optimizing the coding of the multimedia data, transmission and display of the processed multimedia data. In particular, embodiments of the invention receive videos and feedback data associated with the videos from a client device and adaptively encode the videos based on the feedback data. The encoded videos are suitable for transmission over a network and display on the client device, where the network conditions, display requirements and decoding capabilities of the client device are described by the feedback data.

One embodiment of the invention provides a computer-implemented method for adaptively encoding a video for optimal encoding performance. The method includes steps of receiving the video and feedback data associated with the video from a client device and adaptively encoding the video based on the feedback data. The feedback data includes information describing network conditions for transmitting the encoded video over a network, decoding capabilities of the client device for decoding a bitstream representing the encoded video, display requirements of the client device for displaying the decoded bitstream of the video and viewer preferences of viewing the decoded bitstream displayed on the client device. Viewer preferences may be actively input by user, or passively inferred by client device, through gesture recognition.

One embodiment of the computer-implemented method includes steps of adaptively applying one or more color transforms to the video based on the feedback data and adaptively encoding the color transformed video based on the feedback data. Adaptively applying one or more color transforms to the video includes applying each available color transform to the video to generate a color transformed video and analyzing the color transform results by a rate-distortion optimization analysis. Based on the analysis, the embodiment of the method selects a color transformed video that has the best rate-distortion performance among the color transformed videos. Adaptively encoding the color transformed video based on the feedback data includes encoding the video by each available encoder, by varying the many available parameters in the encoding process, and analyzing the encoding results by a rate-distortion optimization analysis. Based on the analysis, the embodiment of the method selects an encoded video that has the best rate-distortion performance among the encoded videos.

Another embodiment of the invention provides a computer-implement method for adaptively decoding a compressed video for optimal rate-distortion performance. The method includes steps of receiving the compressed video, and receiving and/or calculating information describing the network conditions of transmitting the compressed video to a client device. The method further includes steps of decoding the compressed video and generating client side feedback data based on the analysis of the network conditions, decoding capacity data, displaying requirements and viewer's preferences. The client side feedback data is sent to an encoding server to adaptively encoding videos.

The features and advantages described in this summary and the following detailed description are not all-inclusive. Many additional features and advantages will be apparent to one of ordinary skill in the art in view of the drawings, specification, and claims hereof.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

In this disclosure, "digital content of multimedia" generally refers to any machine-readable and machine-storable work product, such as audio, video, images, text, graphics, animations, or even digital content interpretable by the other human senses of touch, taste, and smell. A particular interest is in screen content video, which may be a mix of natural camera-captured and computer-generated video, and related multimedia. This emerging type of content presents special challenges inadequately addressed in the prior art, as it needs full-color sampling (technically 4:4:4 chroma sampling), presents sharp edges and contrasts in some regions, but smooth content and sensor noise in other regions. This heightens the importance of color representations, as well as adaptive coding tools. The following discussion focuses on video content as currently understood for convenience of exposition. However, the techniques described below can also be used with other types of digital content, with the assumption that they are presented time-sequentially in frames, and that the familiar encoding tools of predictors, filters, transforms, quantizers, and entropy coders remain applicable.

Figure 1:
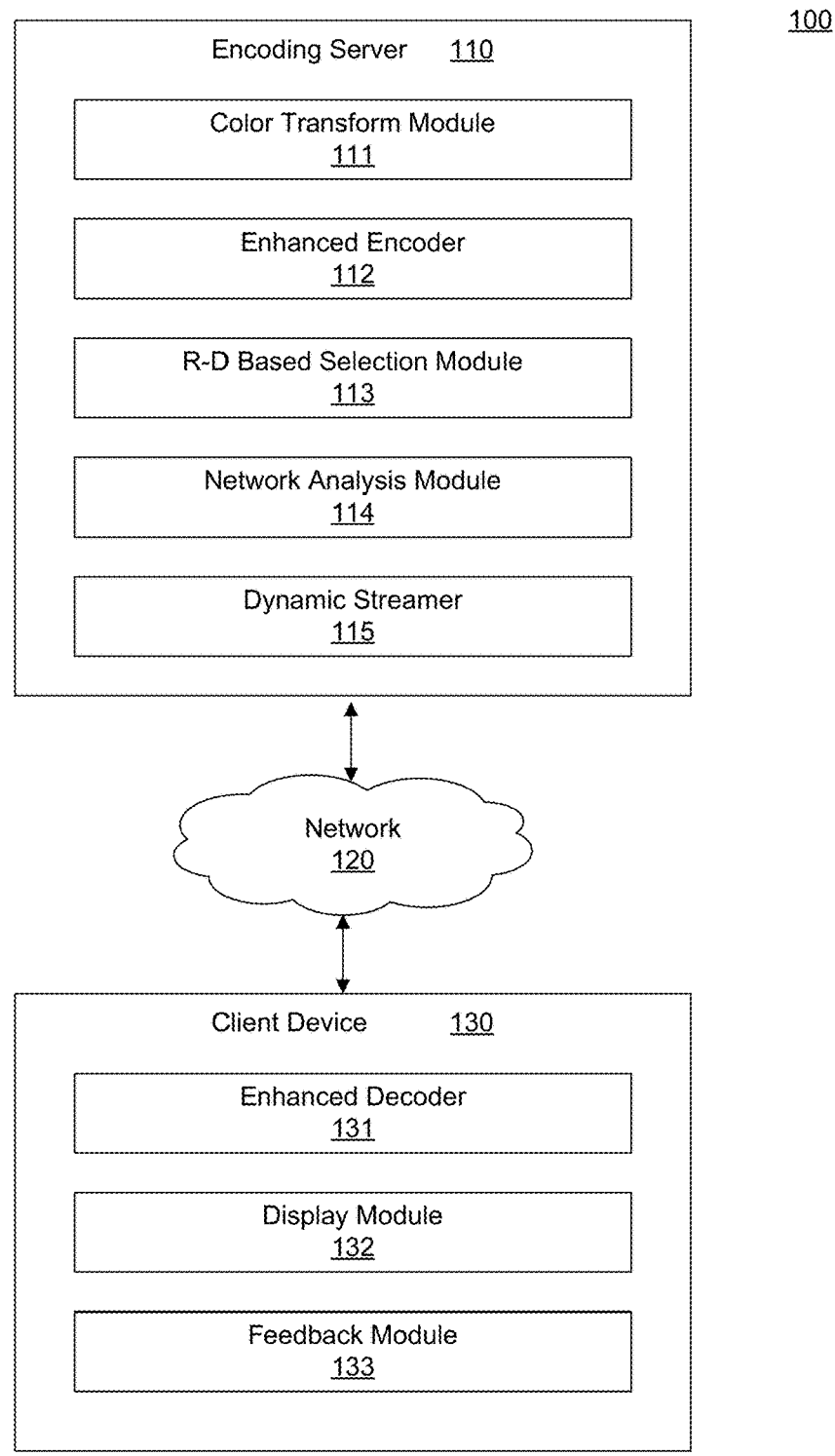
FIG. 1 is a diagram of a computer system for adaptively coding and transmitting a video in accordance with an embodiment of the invention.

FIG. 1 illustrates a computer system 100 for adaptively coding, transmitting and displaying a video to one or more client devices. In one embodiment, the computer system 100 includes an encoding server 110 and a client device 130 connected by a network 120. Only one encoding server 110 and one client device 130 are shown in FIG. 1 in order to simplify and clarify the description. Embodiments of the computing system 100 can have many encoding servers 110 and client devices 130 connected to the network 120. Likewise, the functions performed by the various entities of FIG. 1 may differ in different embodiments.

The encoding server 110 receives videos and feedback data associated with the videos from the client device 130 and adaptively encodes the videos based on the feedback data. The encoded videos are transmitted over the network 120 and displayed on the client device 130. In one embodiment, the encoding server 110 adaptively changes resolution of a video on the fly based on the factors described by the feedback data, including network condition for transmitting the encoded video, network delay, encoder and decoder processing capacity and feedback from viewers of the decoded video. In another embodiment, the encoding server 110 scales the video resolution or quality up or down to adapt to the communication channel's capacity, display requirements of a client device that displays the decoded video or user preferences of viewing the video. In yet another embodiment, the encoding server 110 adaptively encodes the video based on a combination of various factors described by the feedback data.

In one embodiment, the encoding server 110 includes a color transform module 111, an enhanced encoder 112, a rate-distortion optimization (RDO) based selection module 113, a network analysis module 114 and a dynamic video streamer 115. Other embodiments of the encoding server 110 include different and/or additional components. In addition, the functions may be distributed among the components in a different manner than described herein.

The color transform module 111 is configured to apply one or more color transforms to a full-color sampled video, to decorrelate the color planes associated with the video. Each color transform applied to the video produces a color transformed video. Based on rate-distortion based analysis of color transform results of the video, the encoding server 110 adaptively selects a color transformed video that has the best color transform performance. The color transform module 111 is further described below with reference to FIG. 5-FIG. 6.

The enhanced encoder 112 encodes a video into a bitstream with enhanced coding performances suitable for transmission over the network 120. The enhanced encoder 112 applies one or more encoding schemes, e.g., adaptive predictors, adaptive spatial transforms, adaptive filters including resolution-changing filters, adaptive quantizers and adaptive entropy encoders, to the video to generate an encoded video. Based on rate-distortion based analysis of encoding results of the video, the encoding server 110 adaptively selects an encoded video that has the best encoding performance. The enhanced encoder 112 is further described below with reference to FIG. 4.

The RDO based selection module 113 analyzes the color transform results and the various encoding results of the input video using a RDO function. The RDO based selection module 113 selects an encoded video that has the best color transform performance as well as the best encoding performance among the multiple video encoding tools. The RDO based selection module 113 is further described below with reference to FIG. 3 and FIG. 7.

The network analysis module 114 collects data describing the network conditions for transmitting the encoded video to the client device 130. In one embodiment, the network analysis module 114 is configured to analysis network protocols, e.g., Real-time Transport Protocol (RTP) and Real-Time Streaming Protocol (RTSP), to derive data describing the available bandwidth of the network (e.g., the network 120 shown in FIG. 1). The encoding server 110 uses the network condition data to adaptively adjust the data rate for transmitting the encoded video bitstream to the client device 130. In another embodiment, the encoding server 110 adaptively filters the encoded video (e.g., smoothing encoding noise), varies video resolution and/or adjust encoding structure (e.g., using additional filters) to meet the variable network bandwidth constraints.

The dynamic streamer 115 is configured to select a suitable type of stream among available pre-encoded video bitstreams based on the feedback data received by the encoding server 110 and to transmit the selected bitstream to the client device 130. In one embodiment, the dynamic streaming 115 and the enhanced encoder 112 are implemented as one integrated entity, where the enhanced encoder 112 functions as a dynamic streamer 115 in response to receiving pre-encoded video streams. In another embodiment, the dynamic streamer 115 and the enhanced encoder 112 are implemented as two separate entities.

Figure 2:
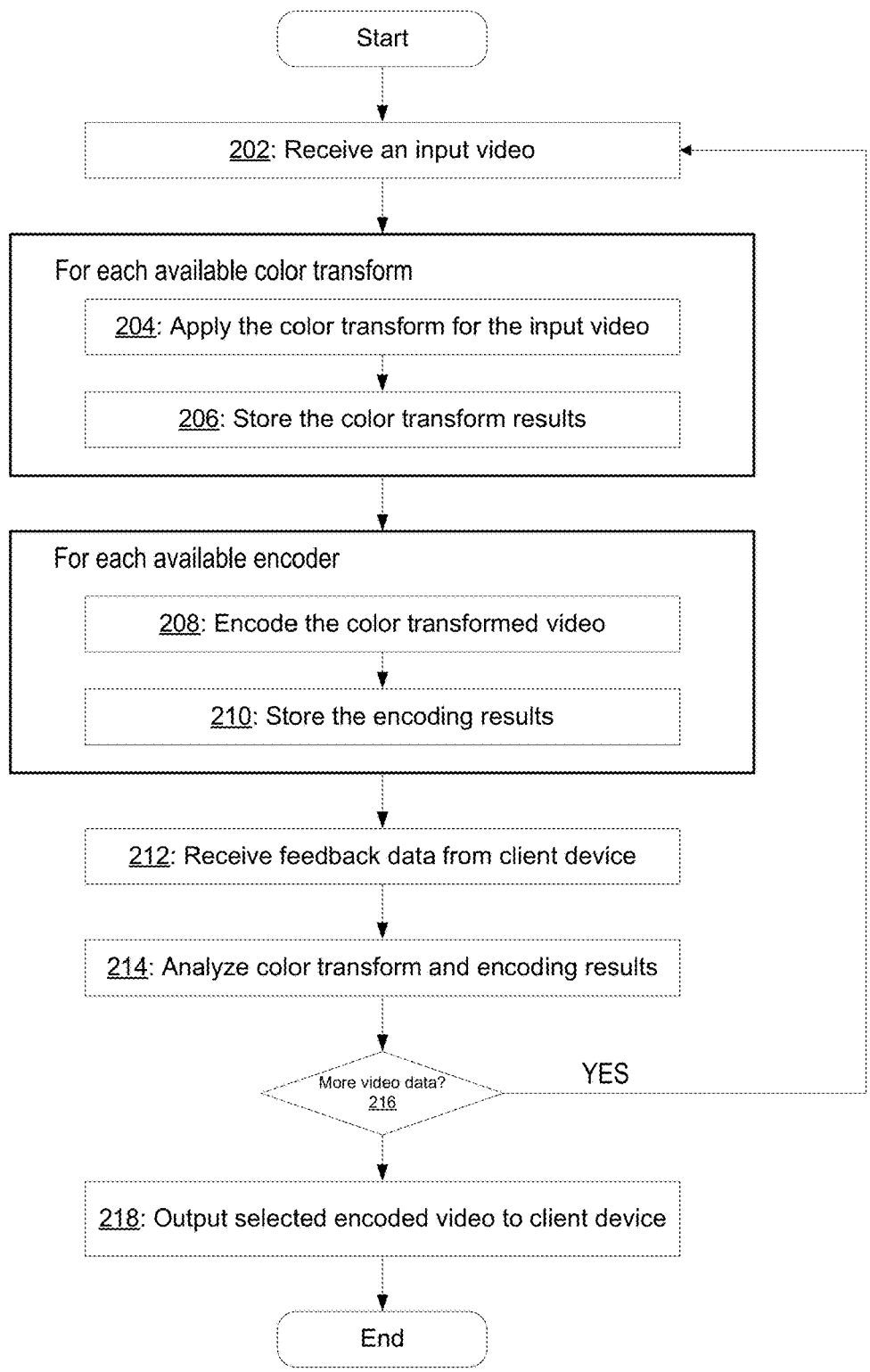
FIG. 2 is a flow chart of a process of adaptively encoding a video in accordance with an embodiment of the invention.

FIG. 2 is a flow chart of a process of adaptively encoding a video sequence in accordance with an embodiment of the invention. An encoding server 110 as illustrated in FIG. 1 receives 202 a video from a source, e.g., a content provider, an end user or data storage. For each available color transform, the encoding server 110 applies 204 the color transform to the video at either the sequence, frame, slice, or block level, and stores 206 the color transform results for further processing. For each available video encoder, the encoding server 110 encodes 208 the color transformed video and stores 210 the encoding results for further processing. The encoding server 110 receives feedback data from the client device 130 and analyzes 214 the color transform results and encoding results associated with the video based on the feedback data. Based on the analysis, the encoding server 110 selects and outputs 218 selected encoded video to the client device 130 for display. In response to more video data for processing, the encoding server 130 repeats the steps of 202 to 218. The analysis based on the feedback data in step 214 is further described below with respect to FIG. 3.

The network 120 enables communications between the encoding server 110 and the client device 130 and can comprise a variety of networks such as the Internet as well as mobile telephone networks. In one embodiment, the network 120 uses standard communications technologies and/or protocols. Thus, the network 120 can include links using technologies such as Ethernet, 802.11, worldwide interoperability for microwave access (WiMAX), 2G/3G/4G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

A client device 130 is an electronic device used by a user to perform functions such as consuming digital content, decoding received videos, playing back videos, executing software applications, interacting with the encoding server 110 and providing a variety of feedback data to the encoding server 110. In one embodiment, the client device 130 includes an enhanced decoder 131, a display module 132 and a feedback module 133. Other embodiments of the client device 130 include different and/or additional components. In addition, the functions may be distributed among the components in a different manner than described herein.

The enhanced decoder 131 receives an encoded video bitstream from the encoding server 110 over the network 120 and decodes the video bitstream into a reconstructed video corresponding to the video encoded by the encoding server 110 for display. In one embodiment, the enhanced decoder 131 performs the similar functions as the enhanced encoder 112 in a reverse order, such as entropy decoding, inverse quantization and inverse transform.

The enhanced decoder 131 associated with different client devices 130 has different decoding capabilities, which are transmitted to the encoding server 110 via the feedback module 133. For example, for handsets and tablets, the enhanced decoder 131 decodes the received video bitstream in a central processing unit (CPU) with assistance of a graphic processing unit (GPU) of the client device 130. For laptops and desktop computers, the enhanced decoder 131 decodes the received video bitstream in a GPU with a specialized hardware accelerator of the client device 130. For TV monitors, the enhanced decoder 131 typically resides in embedded hardware or in set-top boxes, and is capable of real-time decoding the received video bitstream. Upon receiving the decoding capability data, the encoding server 110 may adjust the encoding. For example, if the client device 130 is incapable of decoding high-definition (HD) video (e.g., for real-time display on a handset), the encoding server 110 downscales the encoded video stream in accordance with the decoding capability.

The display module 132 is configured to display the decoded video by the enhanced decoder 131 and provides feedback data describing display requirements of the client device 130. For example, the client device 130 may be a dedicated display device (such as TV with a big screen), a smart phone, or a tablet, notebook, or desktop computer screen. Different display devices have different capabilities to display a decoded video. For example, current display devices have various resolutions in a wide range of display pixels, including sub-Standard Definition (sub-SD), SD, 720p and 1080p. Emerging high-end handsets, tablets, laptops, computers and TVs have even wider range of available display resolutions. The display module 132 provides the display requirements to the feedback module 133, which transmits the feedback data to the encoding server 110 to guide the encoding process.

The feedback module 133 is configured to generate feedback data and transmit the feedback data to the encoding server 110. In one embodiment, the feedback module 133 generates the feedback data from the network condition data received from the network analysis module 114 of the encoding server 110, the decoding capability data associated with the enhanced decoder 131 and the display requirements associated with the display module 132.

Additionally, the feedback module 133 derives information describing the users of the client device 130, e.g., viewers of the decoded video, and viewing conditions at the time (e.g., the lighting sources). We will label such information as viewer preferences. In one embodiment, the feedback module 133 uses visual gesture recognition schemes to detect a human face of the viewer and estimate the distance between the display device and the detected human face. From the estimated distance and display capabilities of the client device 130, the feedback module 133 determines suitable resolution and video quality for the identified viewer. Examples of the embodiments of visual gesture recognition include some described in U.S. patent application Ser. No. 14/085,591, which is incorporated by reference herein in its entirety.

Figure 8:
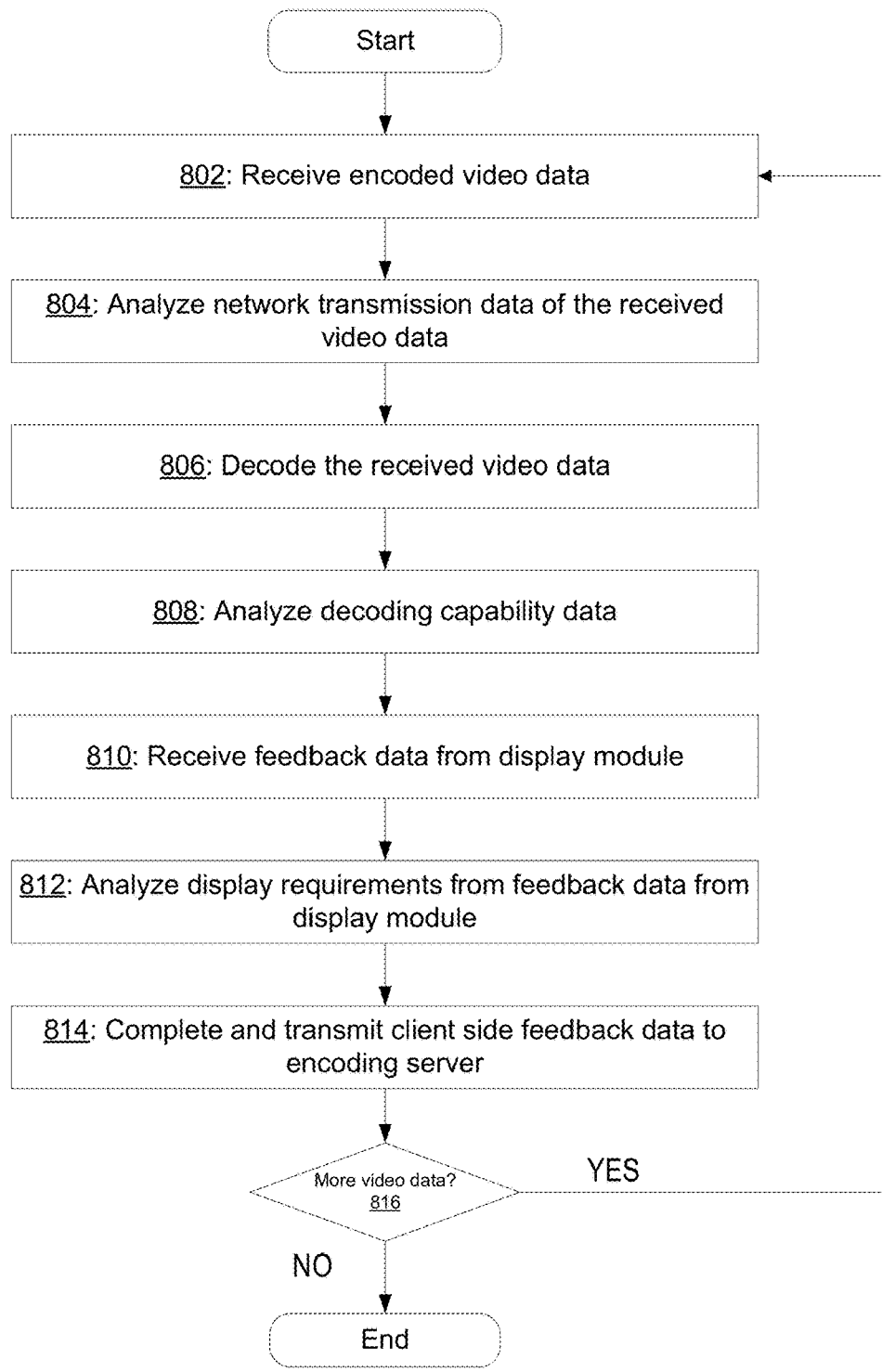
FIG. 8 is a flow chart of process of decoding a video in accordance with an embodiment of the invention.

FIG. 8 is a flow chart of the process of decoding a video in accordance with an embodiment of the invention. Initially, the client device 130 as illustrated in the FIG. 1 receives 802 encoded video data, e.g., an encoded video bitstream by the encoding server 110, and analyzes 804 network transmission data of the received video data, such as network bandwidth as a function of time and lost data packet rates. The client device 130 decodes 806 the received video data and analyzes 808 the decoding capability data associated with the decoding. The client device 130 also receives 810 feedback data from the display module 132, where the feedback data describes the video display conditions and viewer requirements. The client device 130 analyzes 812 the display requirements based on the feedback data from the display module 132. The client device 130 generates client side feedback data that includes decoding capability, network transmission data and display requirements and transmits 814 the client side feedback data to the encoding server 110.

Adaptive Color Transform

Figure 5:
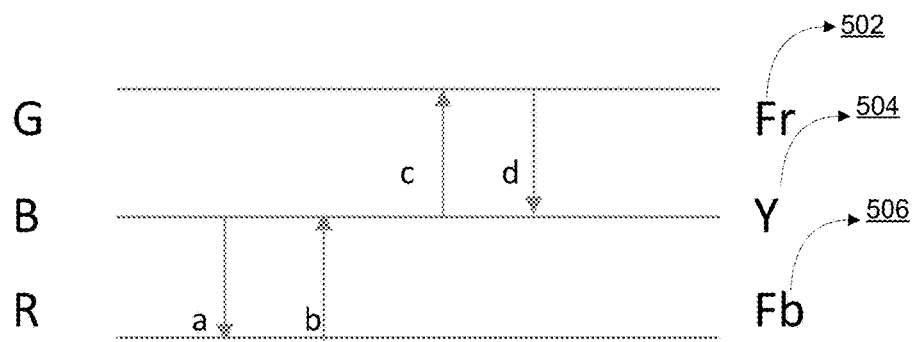
FIG. 5 illustrates an exemplary adaptive color transform in accordance with an embodiment of the invention.

Referring back to FIG. 1, the color transform module 111 of the encoding server 110 is configured to apply one or more color transforms to a video to decorrelate the color planes associated with the video. In one embodiment, the color transform module 111 decorrelates color planes of the video in 4:4:4 color sampling formats in an RGB (red, green, blue) color space using a small library of fixed color transforms. FIG. 5 illustrates an exemplary adaptive color transform in accordance with an embodiment of the invention. The example illustrated in FIG. 5 shows a 4-parameter family of color transforms, where the parameters, a, b, c, d, are the coefficients of the four lifting steps in the flow graph. Additional features could include incorporating scale factors or butterfly steps in the design. With the parameters, a, b, c, d, the RGB color space data is transformed to a new FrYFb color space as follows:

$Fb = R + aB$ $t = bR + (1+ab)B$ $Fr = G + ct = G + bcR + c(1+ab)B$ $Y = t + dFr = dG + (1+cd)t = dG + b(1+cd)R + (1+ab)(1+cd)B.$

Figure 6:
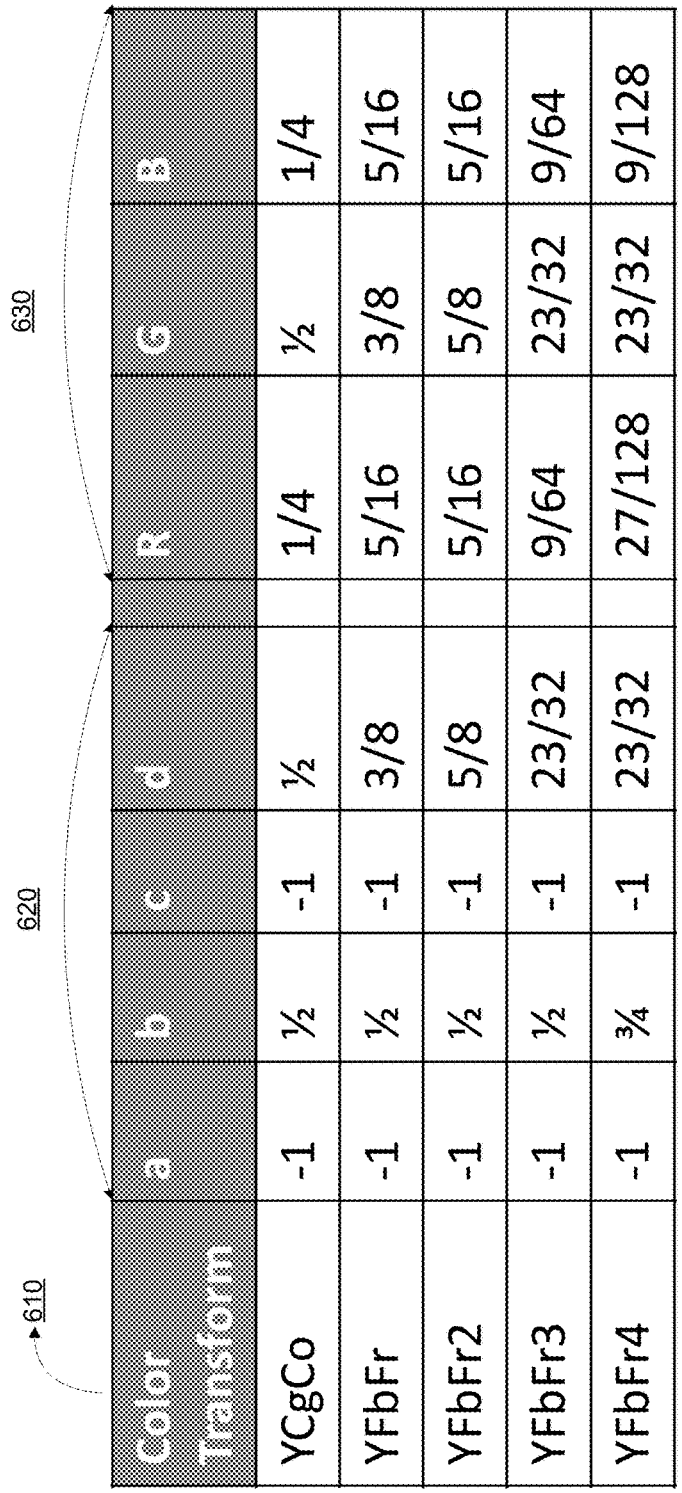
FIG. 6 illustrates examples of adaptive color transform in accordance with an embodiment of the invention.

Note that fixing any subset of parameters gives a subfamily of color spaces. FIG. 6 illustrates examples of a set of five fixed color transforms in accordance with an embodiment of the invention. The five color transforms include YCgCo, YFbFr, YFbFr2, YFbFr3 and YFbFr4, which are computed with different coefficients represented by the parameters a, b, c, d. For example, for $b=d=\frac{1}{2}$, and $a=c=-1$, the color transform module 111 transforms the video in RGB color space to the YCgCo color space as used in the AVC and HEVC video standards. In one embodiment, the color transform module 111 selects the color transform parameters to approximate the known YCbCr color space, which is frequently used in video coding.

Each color transform applied to the video produces a color transformed video. The color transform module 111 is configured to adaptively apply the color transforms to the video at different levels, including at the video sequence level, group of pictures (GOP) level, frame level or block level, to offer increasingly finer granularity. An RDO based analysis of color transform results of the video enables the encoding server 110 to select a color transformed video that has the best color transform performance.

In another embodiment, the color transform module 111 is configured to evaluate and model the color correlation structure of the video signal (at any of the above mentioned levels), compute an optimized color transform (e.g., the Karhunen-Loeve Transform (KLT)), and use the optimized color transform to encode the video. The color transform module 111 can be designed to approximate such an optimized color transform with exactly invertible integer color transforms. The advantages of optimizing color transform in this way include precise bit control, exact inversion in finite arithmetic, and simple shift and add computation while maintaining high coding gain. For example, given an arbitrary color correlation matrix, the color transform module 111 can be configured to use suitable color transforms to encode a video.

Enhanced Encoder

The enhanced encoder 112 encodes a video into a bitstream with enhanced coding performance suitable for transmission over the network 120. Generally, for a given time period and specified bit rate for encoding a video, the enhanced encoder 112 is configured to produce the highest quality video bitstream, as measured by one of several visual quality metrics within the specified bit rate constraint. The enhanced encoder 112 has multiple data points to select to achieve coding efficiency, including the type (e.g., block based) and distribution of digital content (e.g., natural or computer generated video content); statistics on aspects of the video segment (e.g., by blocks, frame or block of frames), color sampling format and saturation; correlation structures and the recently coded data for prediction. In case of pre-encoded video bitstream, the enhanced encoder 112 may function as a dynamic streamer 115 and can optimize the transmission of the video bitstream by intelligently selecting between various versions of the bitstream, e.g., stored or live.

Figure 4:
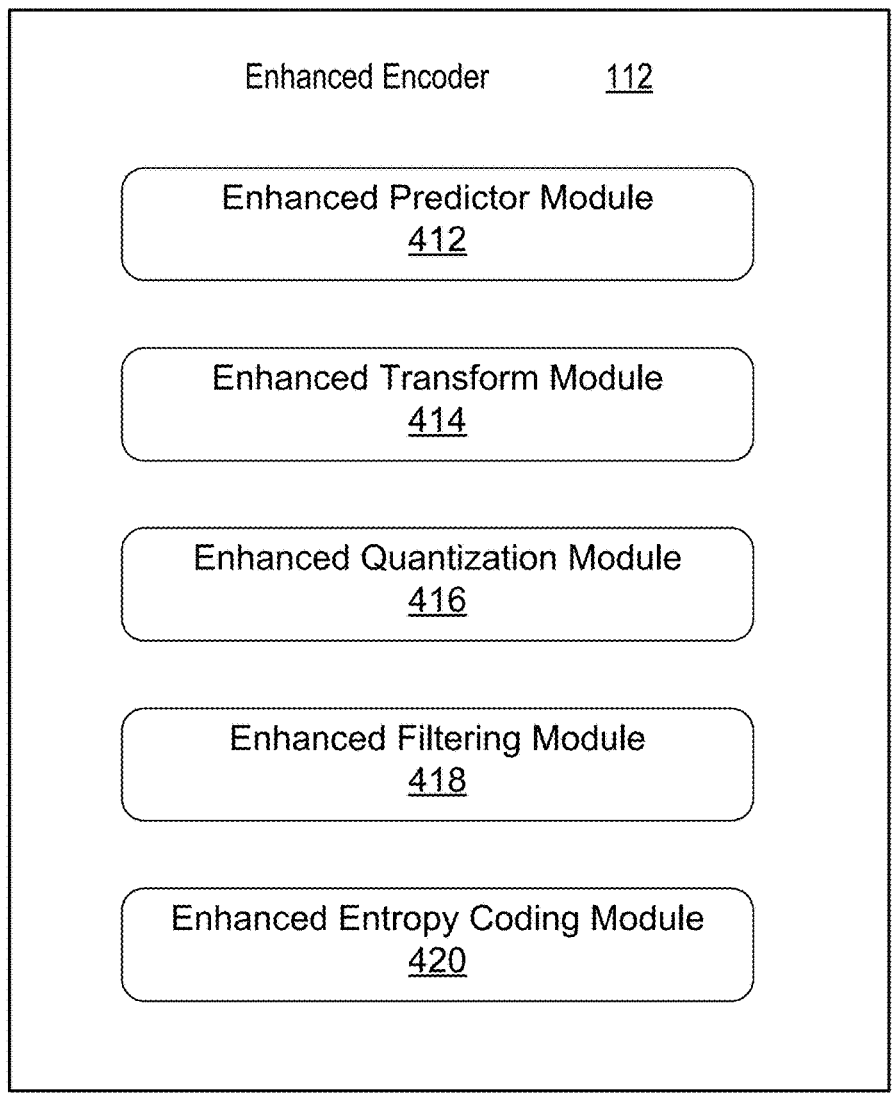
FIG. 4 is a block diagram of an enhanced encoder for adaptive encoding a video in accordance with an embodiment of the invention.

FIG. 4 is a block diagram of an enhanced encoder 1121 for adaptive encoding a video in accordance with an embodiment of the invention. The embodiment of the enhanced encoder 112 shown in FIG. 4 includes an enhanced predictor module 412, an enhanced spatial transform module 414, an enhanced quantization module 416, an enhanced filtering module 418 and an enhanced entropy coding module 420. Other embodiments of the enhanced encoder 112 include different and/or additional components. In addition, the functions may be distributed among the components in a different manner than described herein.

The enhanced predictor module 412 is configured to provide robust reference points as predictors during encoding process, e.g., motion vector estimation and compensation, as well as intra prediction. In addition to currently existing predictors for both intra and inter-frame types of a video, e.g., 34 intra frame prediction modes, and for both natural video and screen content video, the enhanced predictor module 412 provides additional predictors for adaptability and enhanced coding performance. For example, screen content tends to have limited color and brightness levels, sharp boundaries, and at least portions that are either stationary or move in ensemble. For screen content, the enhanced predictor module 412 uses additional predictors, such as IntraBlock Copy and Palette Mode.

The enhanced transform module 414 is configured to apply spatial transform to compact information contained in the video. In existing High Efficiency Video Coding (HEVC) standard, fixed spatial transforms of size, e.g., 4, 8, 16, and 32 pixels, are used. For the 4-point transform size, there are two fixed transforms available: a discrete cosine transform (DCT)-type and a discrete sine transform (DST)-type; for all other transform sizes, they are fixed DCT type transforms. In addition to the fixed spatial transforms, the enhanced transform module 414 is configured to use adaptive spatial transforms, e.g., varying spatial transforms, even within a fixed spatial dimension.

The enhanced quantization module 416 is configured to apply adaptive quantization to a video being encoded. Existing coding standards, e.g., the HEVC standard, uses linear and fixed quantizer in the decoding process, which the quantization step size is increased by a factor of 2 after each set of six steps. Further, the HEVC standard limits the quantization flexibility to at most adjusting scaling factors for the dequantization process. The enhanced quantization module 416 is designed to choose a quantizer, which can be linear or nonlinear, uniform or non-uniform (e.g., variance-adaptive quantization), scalar or vector as desired by the encoding server 110. The enhanced quantization module 416 is further configured to index the type of the quantizer for different type of coding levels, e.g., for sequence, group of pictures, frame, or block. The flexibility of quantization offered by the enhanced quantization module 416 provides improved coding efficiencies with acceptable computational complexity at the decoder.

The enhanced filtering module 416 is configured to apply one or more filters to smooth out noise generated during encoding process, e.g., deblocking filters and sample adaptive offset filters. Existing solutions of filtering limit the use of the filters in the encoding process, e.g., in prediction loop in the HEVC coding standard. The enhanced filtering module 416 is designed to use additional filters and to use the filters beyond the prediction loop during the encoding process. The additional filters for the enhanced filtering module 418 include resampling filters for adaptive resolution coding, noise reduction filters including wiener filters. The additional filters enable the enhanced filtering module 418 to further improve the coding performance adaptively.

The enhanced entropy coding module 420 is configured to adaptively select entropy coding schemes. The current solutions, e.g., the HEVC coding standard, have limited choice of entropy coding schemes. For example, the HEVC uses only one entropy coding, i.e., arithmetic coding. The enhanced entropy coding module 420 is designed to use one or more entropy coding adaptively selected for different video content. For example, in the context of mixed natural and computer generated (screen content) video, the enhanced entropy coding module 420 uses two entropy coding schemes, the arithmetic coding and a dictionary-based entropy coding (e.g., pseudo-2D-matching (P2M) coding).

It is noted that screen content contain both discontinuous-tone content and continuous content, which are different in visual characteristics. Typical continuous-tone content includes natural (camera-captured) pictures and videos, and typical discontinuous contents include text, computer generated graphics and animations. Traditional hybrid coding, e.g., the HEVC coding, is efficient in compressing continuous-tone content, while dictionary coding compresses discontinuous-tone content well. The enhanced entropy coding module 420 is designed to switch between different types of coders based on the video content.

In one embodiment, the enhanced entropy coding module 420 applies a pre-analysis on a video fragment to determine the type of continuity/discontinuity of the fragment. For example, in one embodiment, each coding unit (CU) in each frame is assigned a flag to describe which category of continuity the CU belongs to. The enhanced entropy coding module 420 applies P2M coding scheme to break a largest coding unit (LCU) into many horizontal or vertical line segments and searches matching line segments in the searching-window consisting of previously P2M coded pixels. In one embodiment, the enhanced entropy coding module 420 uses a large search window of 4K to 4M pixels to find a good match and can use a hash-table to accelerate the search. At the CU level, a LCU is simultaneously coded by other coders, i.e., HEVC or Palette coder. Bit stream and reconstructed LCU are sent to a RDO based selector, where the encoding with the best rate-distortion performance is selected as the final coding for the current LCU.

Figure 9:
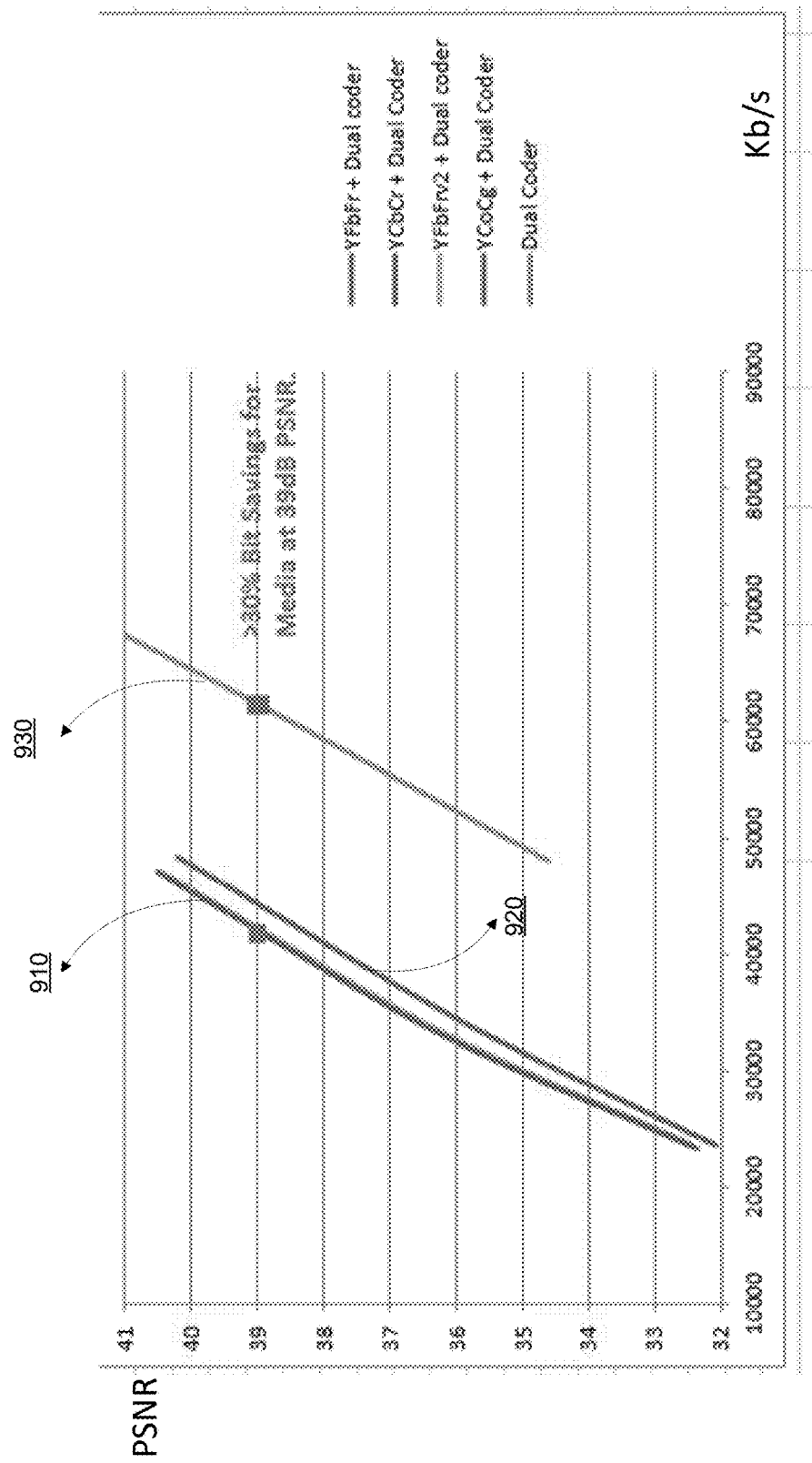
FIG. 9 illustrates performance by exemplary color transforms in conjunction with video encoding in accordance with an embodiment of the invention.
Figure 10:
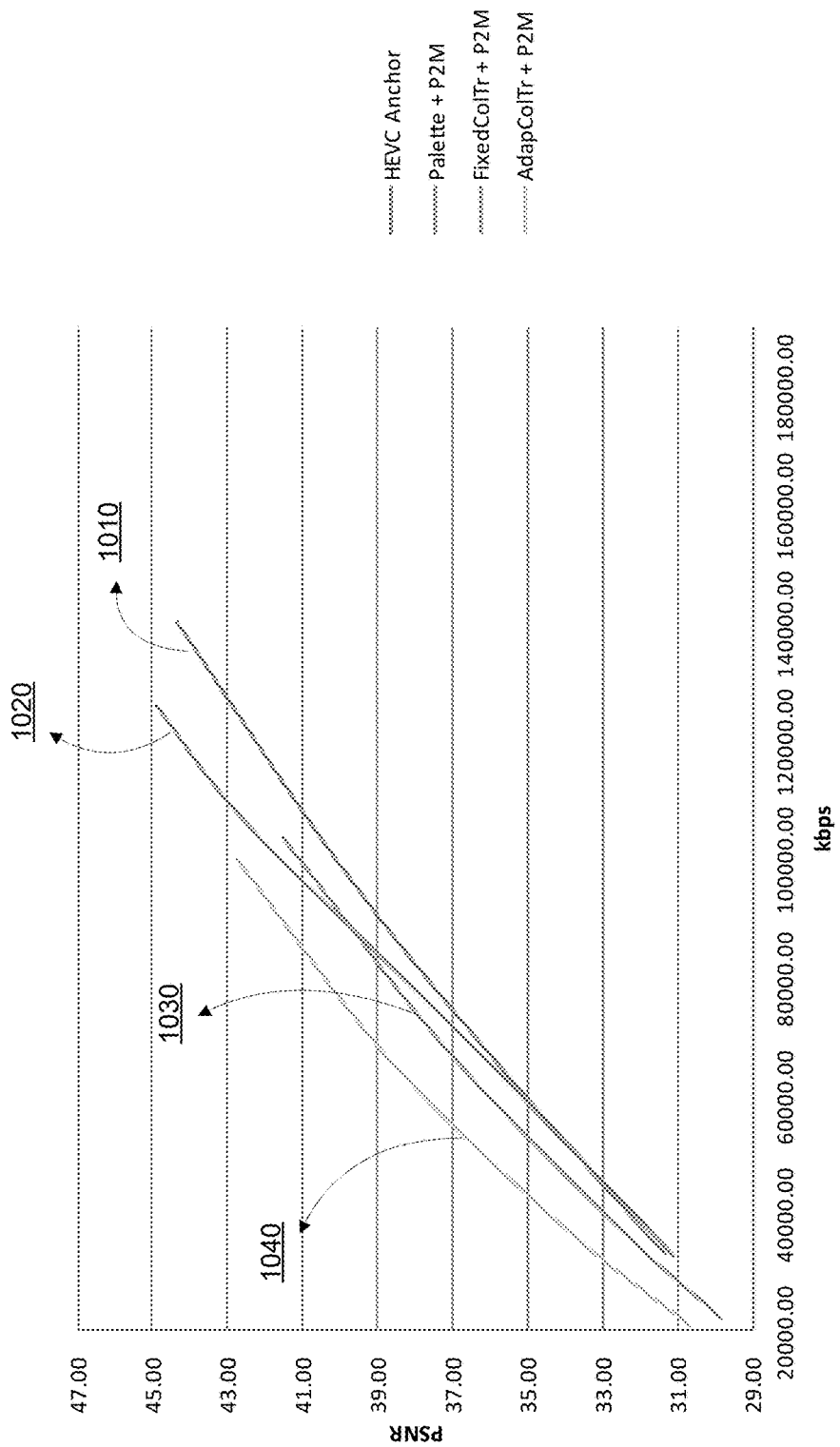
FIG. 10 illustrates examples of performance of color transforms in conjunction with video encoding in accordance with an embodiment of the invention.

The large amount of adaptability offered by the enhanced encoder 112 through its enhanced coding tools/modules, e.g., modules 412-420, is well beyond the current solutions including the HEVC standard. Furthermore, the current solutions have not yet provided solutions for different data types of video, e.g., screen content or mixture of natural and screen content of a video. The experimental data shown in FIG. 9 and FIG. 10 show improved encoding performance, e.g., a 30%+ performance gain over the P2M coder (which in turn has been shown to give some 50% coding gain over the existing HEVC standard) for certain screen content test sequences, resulting in dramatic gains over prior art.

RDO Based Analysis and Selection

Referring back to FIG. 1, the RDO based selection module 113 of the encoding server 110 analyzes the color transform results and encoding results of a video using a rate-distortion optimization function. The RDO based selection module 113 selects an encoded video that has the best color transform performance among the multiple color transforms and the selected video also has the best encoding performance among the multiple video encoders.

Rate-distortion based analysis views encoder selection as a control problem, and effectively tests each combination of coding parameters to see which one offers the best tradeoff in terms of minimizing distortion for a given bit budget. More specifically, given a parametric family F={f} variables under optimization, the RDO based selection module 113 is configured to minimize a cost functional J given by $$J(f)=D(f)+\lambda R(f), f \in F$$

where D(f) is the distortion function, R(f) is the date rate and $\lambda$ is an unknown Lagrange multiplier. The RDO based selection module 113 is configured to minimize J(f) as $$\min_{f \in F} J(f)$$

where the RDO based selection module 113 is designed to optimize distortion and data rate simultaneously using Langrage calculus with undetermined multipliers.

To further improve the performance of the rate-distortion optimization, the RDO based selection module 113 adaptively applies the rate-distortion optimization to one or more of the encoding parameters described by the various coding modules, e.g., the color transform module 111 and the encoding modules 412-420. Each encoder component is analyzed with respect to rate-distortion optimization. For example, the RDO based selection module 113 applies the rate-distortion optimization analysis to color transform results of a video and selects a color transform that produces the best color transform quality for the video. The selected color transform can be indexed to simplify retrieval during coding process. Similarly, the RDO based selection module 113 applies the rate-distortion optimization analysis to entropy coding results of a video by the enhanced entropy coding module 420 and selects the entropy coding that produces the best coding performance for the video. Furthermore, the RDO based selection module 113 combines the rate-distortion optimization analysis of the color transform results and encoding results of a video and selects an encoded video that has the best color transform performance among the multiple color transforms and the selected video also has the best encoding performance among the multiple video encoding schemes.

Figure 3:
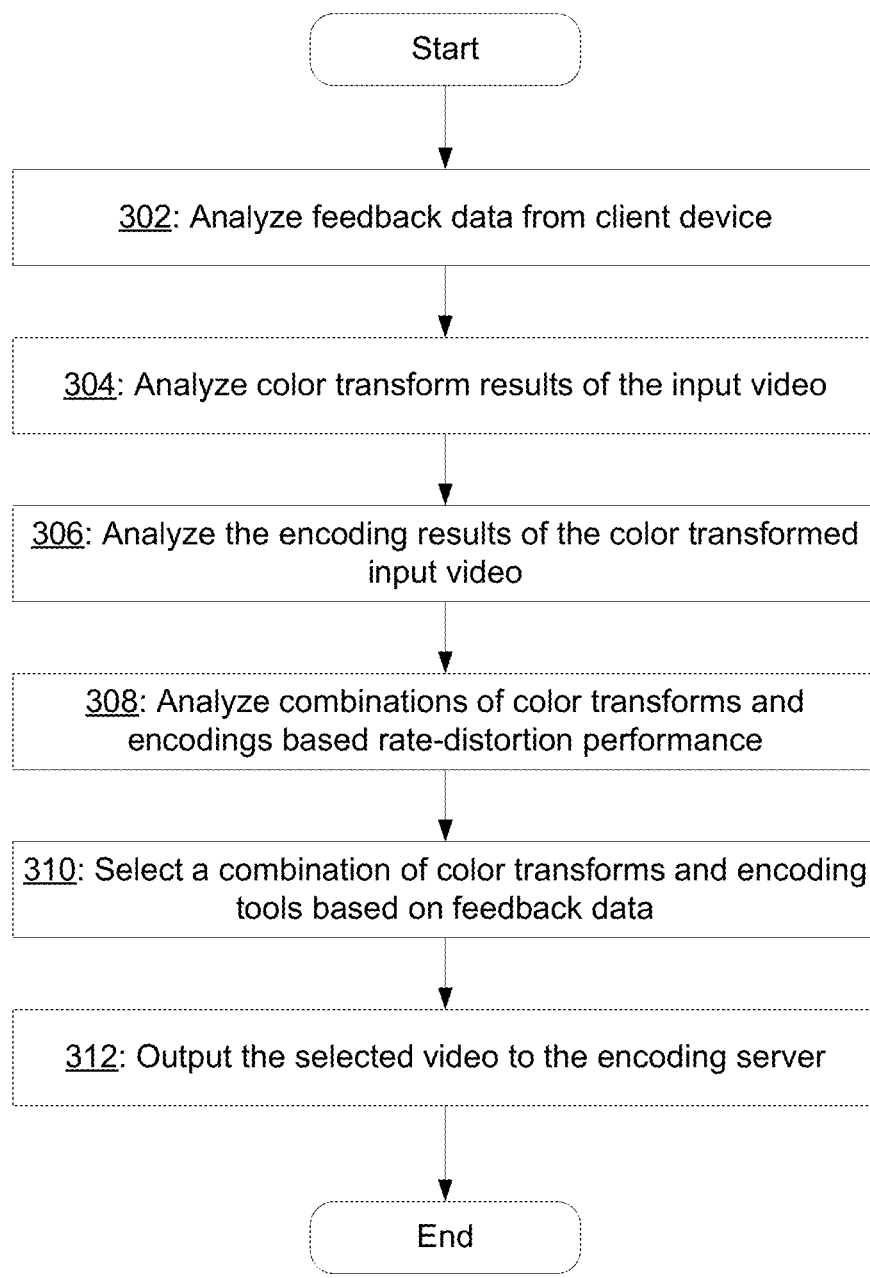
FIG. 3 is a flow chart of process of rate-distortion (RDO) based analysis and selection of an encoded video in accordance with an embodiment of the invention.

FIG. 3 is a flow chart of process of RDO based analysis and selection of an encoded video in accordance with an embodiment of the invention. Initially, the RDO based selection module 113 analyzes 302 the feedback data from client device 130, where the feedback data describe the network conditions, decoding capability data, display requirements of the client device 130 and/or viewer's preferences. The RDO based selection module 113 further analyzes 304 the color transform results of the video and analyzes 306 the encoding results of the color transformed video. The RDO based selection module 113 can analyze 308 the combinations of color transform and encoding results based on rate-distortion optimization as described above. Based on the analysis, the RDO based selection module 113 selects 310 a combination of color transforms and encoding tools (e.g., the encoding modules 412-420) based on the feedback data and outputs 312 the selected video to the encoding server 110.

The RDO based selection module 113 further enhances the coding performance by providing flexibility in selecting an encoded video with the best coding performance at different granularity levels. For example, the decisions can be made on GOP level, frame level and CU level. On the encoder side, the selection can be made during color transforms and compression phase by the enhanced encoder 112 including at each individual encoding sub-phase, such as entropy coding.

Figure 7:
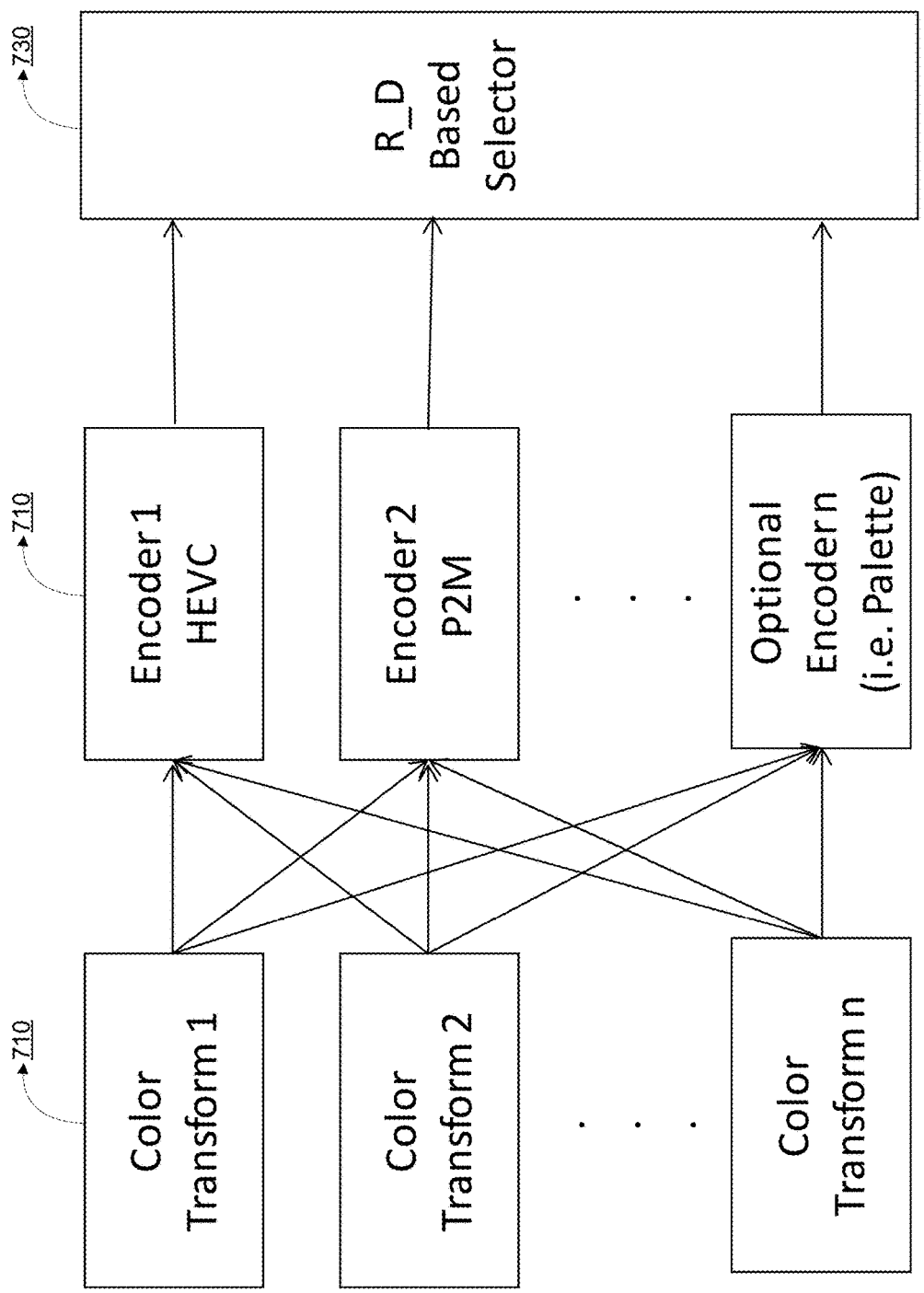
FIG. 7 illustrates an exemplary RDO based analysis and selection of an encoded video in accordance with an embodiment of the invention.

FIG. 7 illustrates an exemplary RDO based analysis and selection of an encoded video in accordance with an embodiment of the invention. As shown in FIG. 7, the encoding server 110 has n number of color transforms 710, e.g., color transform 1 to color transform n. Each color transform 710 applied to a video generates a color transformed video and a color transform may have a different color transform performance from another color transform. The encoding server 110 also has n number of encoders 710, e.g., HEVC coder (encoder 1), P2M coder (encoder 2) and optional encoder n (e.g., Palette encoder). Each encoder 720 applied to the color coded video generates an encoded video and an encoder may have a different encoding performance from another encoder, e.g., measured by peak-signal-to-noise-ratio (PSNR) of the encoding.

The RDO based selector 730 (e.g., the RDO based selection module 113) has a n*n number of selections to choose an encoded video. In one embodiment, the RDO based selector 730 applies rate-distortion optimization to the color transforms 710, the encoding results from the encoders 720, separately or in combination. Based on the rate-distortion optimization, the RDO based selector 730 selects the encoded video having the best color transform and encoding performance.

It may not be practical for the RDO based selector 730 to test all combinations and find the best choice based on RDO optimization cost. In this situation, the RDO based selector 730 is configured to reduce search complexity and make fast, early termination decisions. For example, the RDO based selector 730 can perform frame level color space conversion and CU-level encoding. In another embodiment, the RDO based selector 730 uses training data based on content features extracted from video training samples, where the RDO based selector 730 efficiently tests only for the first L combinations with the highest probabilities of success, where L is much smaller than the total number of possible combinations. Even then, if an RDO objective is met in the process, it can terminate search early.

Experimental Data

The computer system 100 as illustrated in FIG. 100 provides a large amount of adaptability through its color transform module 111, the enhanced encoder 112 and the client side feedback data. Compared with the current solutions, e.g., the HEVC coding, the coding performance by the computer system 100 is enhanced. Experimental data illustrated in FIG. 9-FIG. 10 show that substantial gains (e.g., 30%+) over both existing and proposed coding technologies are available when enabling adaptive selection of various color transforms and encoding tools at different granularity levels.

FIG. 9 illustrates performance by exemplary color transforms in conjunction with video encoding in accordance with an embodiment of the invention. Five coding performances measured by PSNR are illustrated in FIG. 9: color transform YFbFr with dual coder (the HEVC coder and the P2M coder), color transform YCbCr with dual coder, color transform YFbFfv2 with dual coder, color transform YCoCg with dual coder and dual coder alone. Comparing with the coding performance by dual coder 930 at 39 dB PSNR, the various color transforms with dual coder, e.g., performance data by YCoCg with dual coder 910 and one by YCbCr with dual coder 920, can save more than 30% coding bits.

FIG. 10 illustrates examples of performance of color transforms in conjunction with video encoding in accordance with an embodiment of the invention. Similar performance improvement can be observed from FIG. 10, where color channel G (green color channel) performance measured in PSNR of various combinations is shown. Comparing with the reference performance by the HEVC coding 1010, color palette based color transform with a P2M coder (1020), fixed color transform with a P2M coder (1030) and adaptive color transform with a P2M coder (1040) have better performance with adaptive color transform having the largest amount of bits saving.

Embodiments of the invention enhance and facilitate multimedia (e.g., videos) transmissions over various communications channels, and particularly for human entertainment consumption. The solutions provided by the embodiments of the invention enable simultaneously optimizing the coding of the multimedia data, transmission and display of the processed multimedia data. A variety of applications is possible, from improved broadcasting, satellite transmission, multimedia data distribution, on demand services, and particularly web-based multimedia publishing and distribution.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by an encoding server comprising one or more processors and memory, an input video;
   generating a plurality of encoded bitstreams from the input video using a plurality of encoding schemes, each encoded bitstream generated by applying a respective encoding scheme of the plurality of encoding schemes to the input video, each of the plurality of encoding schemes including one or more of a color transform or a filtering of the video, and the encoding scheme is associated with one or more of network conditions or capabilities of a client device, the network conditions including bandwidth constraints, the capabilities including video display requirements of the client device;
   receiving feedback data;
   selecting an encoded bitstream from the plurality of encoded bitstreams having a minimum cost according to a rate-distortion optimization (RDO) method, wherein the cost of a corresponding encoded bitstream is determined based on one or more of
   (i) a distortion due to an encoding associated with the corresponding encoded bitstream,
   (ii) a data rate for transmitting the corresponding encoded bitstream according to feedback data received, and
   (iii) the capabilities of a client device; and
   performing one or more of transmitting the selected encoded bitstream or storing the selected bitstream on a storage device.

2. The method of claim 1, wherein the multiple encoding schemes include applying various color transformations in the encoding process at any of sequence, group of frames, frame, or block-level.

3. The method of claim 1, wherein the feedback data comprises at least one of:
   information describing the network conditions for transmitting the encoded bitstream over a network;
   information describing the capabilities of the client device for decoding the encoded bitstream;
   the video display requirements of the client device for displaying the decoded bitstream of the input video; and
   viewer preferences of viewing the decoded bitstream displayed on the client device.

4. The method of claim 3, further comprising:
   obtaining the information describing the network conditions for transmitting the encoded bitstream over the network based on the feedback data; and
   transmitting the encoded bitstream using the obtained information to the client device.

5. The method of claim 1, wherein performing the different encodings on the input video comprises performing at least one of the following:
   applying adaptive preprocessors, including at least one of adaptive loop filters, noise reduction filters, resolution-changing filters and sequence or frame-level color transformations, to the input video to generate a preprocessed video;
   applying adaptive predictors to the preprocessed video to generate a prediction residual video;
   applying adaptive spatial transformations or color transformations to the prediction residual video;
   applying adaptive quantizers to the spatially transformed residual video at one or more coding levels;

applying adaptive filtering at one or more stages in the encoding methods; and applying adaptive entropy encoding to the quantized video using one or more entropy coding schemes.

6. The method of claim 1, wherein filtering of the video comprises an application of resampling of at least a portion of the input video.

7. The method of claim 1, further comprising scaling a quality of at least a portion of the input video based on the feedback data.

8. A non-transitory computer-readable storage medium storing executable computer program instructions, the computer program instructions comprising instructions when executed by a processor of an encoding server cause the processor to:

receive an input video;

generate a plurality of encoded bitstreams from the input video using a plurality of encoding schemes, each encoded bitstream generated by applying a respective encoding scheme of the plurality of encoding schemes to the input video, each of the plurality of encoding schemes including one or more of a color transform or a filtering of the video, and the encoding scheme is associated with one or more of network conditions or capabilities of a client device, the network conditions including bandwidth constraints, the capabilities including video display requirements of the client device;

receive feedback data;

select an encoded bitstream from the plurality of encoded bitstreams having a minimum cost according to a rate-distortion optimization (RDO) method, wherein the cost of a corresponding encoded bitstream determined based on one or more of
  (i) a distortion due to an encoding associated with the corresponding encoded bitstream,
  (ii) a data rate for transmitting the corresponding encoded bitstream according to the feedback data, and
  (iii) the capabilities of a client device; and perform one or more of transmit the selected encoded bitstream or storing the selected bitstream on a storage device.

9. The non-transitory computer-readable storage medium of claim 8, wherein the feedback data comprises at least one of:

information describing the network conditions for transmitting the encoded bitstream over a network;

information describing the capabilities of the client device for decoding the encoded bitstream;

the video display requirements of the client device for displaying the decoded bitstream of the input video; and viewer preferences of viewing the decoded bitstream displayed on the client device.

10. The non-transitory computer-readable storage medium of claim 9 further comprising:

obtaining the information describing the network conditions for transmitting the encoded bitstream over the network based on the feedback data; and transmitting the encoded bitstream using the obtained information to the client device.

11. The non-transitory computer-readable storage medium of claim 8, wherein performing the different encodings on the input video comprises performing at least one of the following:

applying adaptive preprocessors, including at least one of adaptive loop filters, noise reduction filters, resolution-changing filters and sequence or frame-level color transformations, to the input video to generate a preprocessed video;

applying adaptive predictors to the preprocessed video to generate a prediction residual video;

applying adaptive spatial transformations or color transformations to the prediction residual video;

applying adaptive quantizers to the spatially transformed residual video at one or more coding levels;

applying adaptive filtering at one or more stages in the encoding methods; and applying adaptive entropy encoding to the quantized video using one or more entropy coding schemes.

12. The non-transitory computer-readable storage medium of claim 8, wherein filtering of the video comprises an application of resampling of at least a portion of the input video.

13. The non-transitory computer-readable storage medium of claim 8, further comprising scaling a quality of at least a portion of the input video based on the feedback data.

14. A computer-implemented method comprising:

receiving, by an encoding server comprising one or more processors and memory, an input video; and generating a plurality of encoded bitstreams from the input video using a plurality of encoding schemes, each encoded bitstream generated by applying a respective encoding scheme of the plurality of encoding schemes to the input video, each of the plurality of encoding schemes including one or more of a color transform or a filtering of the video, and the encoding scheme is associated with one or more of network conditions or capabilities of a client device, the network conditions including bandwidth constraints, the capabilities including video display requirements of the client device.

15. The method of claim 14, further comprising:

performing different encodings on the input video, performing the different encodings including performing at least one of the following:

applying adaptive preprocessors, including at least one of adaptive loop filters, noise reduction filters, resolution-changing filters and sequence or frame-level color transformations, to the input video to generate a preprocessed video, applying adaptive predictors to the preprocessed video to generate a prediction residual video, applying adaptive spatial transforms or color transforms to the prediction residual video, applying adaptive quantizers to the spatially transformed residual video at one or more coding levels, applying adaptive filtering at one or more stages in the encoding methods, applying adaptive entropy encoding to the quantized video using one or more entropy coding schemes, applying rate distortion optimization to optimize the encoded bitstreams, and applying rate control to an encoder to produce the encoded bitstreams conforming to data rates.

16. The method of claim 14, wherein the feedback data comprises at least one of:

information describing the network conditions for transmitting the encoded bitstream over a network;

information describing the capabilities of the client device for decoding the encoded bitstream;

the video display requirements of the client device for displaying the decoded bitstream of the input video; and viewer preferences of viewing the decoded bitstream displayed on the client device.

17. The method of claim 16, further comprising:

obtaining the information describing the network conditions for transmitting the encoded bitstream over the network based on the feedback data; and transmitting the encoded bitstream using the obtained information to the client device.

18. A computer-implemented method performed by a dynamic streaming server comprising a processor and a memory, the method performed by the processor comprising:

receiving a plurality of encoded bitstreams corresponding to an input video corresponding to a plurality of encoding schemes, each encoded bitstream generated by applying a respective encoding scheme of the plurality of encoding schemes to the input video, each of the plurality of encoding schemes including one or more of a color transform or a filtering of the video, and the encoding scheme is associated with one or more of network conditions or capabilities of a client device, the network conditions including bandwidth constraints, each capability of the client device including video display requirements;

receiving feedback data;

selecting an encoded bitstream from the plurality of encoded bitstreams having a minimum cost according to a rate-distortion optimization (RDO) method, wherein the cost of a corresponding encoded bitstream determined based on one or more of (i) a distortion due to an encoding associated with the corresponding encoded bitstream, and (ii) a data rate for transmitting the corresponding encoded bitstream according to the feedback data; and transmitting the selected encoded bitstream or storing the selected bitstream on a storage device.

19. The method of claim 18, wherein the feedback data comprises at least one of:

information describing the network conditions for transmitting the encoded bitstream over a network;

information describing the capabilities of the client device for decoding the encoded bitstream;

the video display requirements of the client device for displaying the decoded bitstream of the input video; and viewer preferences of viewing the decoded bitstream displayed on the client device.

20. The method of claim 19, wherein the information describing the network conditions includes at least one of network bandwidth, network delay, and packet loss rate.

* * * * *